United States Patent Office 2,945,886
Patented July 19, 1960

2,945,886

METHOD FOR REDUCING CHEMICAL COMPOUNDS BY REACTING WITH ALKALI METAL BOROHYDRIDES

Herbert C. Brown, 1840 Garden St., West Lafayette, Ind.

No Drawing. Filed Feb. 20, 1957, Ser. No. 641,272

11 Claims. (Cl. 260—570.9)

This invention relates to the use of alkali metal borohydrides for reducing and hydrogenating chemical compounds containing a reducible functional group. More particularly, the invention is directed to the reduction and hydrogenation of such compounds by the use of a reagent consisting of an alkali metal borohydride and a boron halide.

The United States patent to H. I. Schlesinger and Herbert C. Brown No. 2,683,721 describes methods for reducing and hydrogenating chemical compounds by associating the compound with an alkali metal borohydride in a liquid carrier. The alkali metal borohydrides are relatively mild reducing agents. They reduce aldehydes and ketones quite rapidly but their action on difficultly reducible groups, such as ester, nitrile and tertiary amide groups, is much slower. This is highly useful since it permits the selective reduction of an aldehyde or ketone group in the presence of an ester, nitrile or tertiary amide group.

In my copending application Serial No. 521,873, filed July 13, 1955, now Patent No. 2,856,428 issued October 14, 1958, I have described the reduction and hydrogenation of chemical compounds containing a reducible functional group by reaction with a reagent consisting of an alkali metal borohydride and a halide of a polyvalent metal having a valence greater than two and less than six, such as aluminum chloride, gallium chloride, etc., in a liquid carrier, such as a solvent for the alkali metal borohydride. The addition of such metal halides to solutions of alkali metal borohydrides greatly increases the reducing capacity of the alkali metal borohydride. Such reagents rapidly reduce aldehyde, ketone, ester, nitrile and tertiary amide groups.

The reagents of my above mentioned copending application did not include halides of metalloids, such as boron halides. The addition of a stoichiometric quantity of a boron halide to a solution of an alkali metal borohydride results in a rapid and essentially complete loss of the active hydrogen of the solution and, consequently, it might be expected that such a reagent would be inoperative for reducing and hydrogenating chemical compounds.

I have discovered that under certain conditions a reagent consisting of a boron halide and an alkali metal borohydride is exceedingly effective in enhancing the reducing properties of alkali metal borohydrides. However, the reducing properties of this reagent differ markedly from those of the alkali metal borohydrides themselves and the reagent consisting of a halide of a polyvalent metal and an alkali metal borohydride. For example, sodium borohydride reduces aldehydes and ketones rapidly but reduces ester, nitrile and nitro groups quite slowly. The addition of aluminum chloride produces a reagent which reduces aldehydes, ketones, esters and nitriles very rapidly. On the other hand, the reagent of the present invention reduces aldehyde, ketone and nitrile groups quite rapidly but reduces ester and nitro groups relatively slowly. Thus the present invention makes possible for the first time the utilization of alkali metal borohydrides for the selective reduction of the nitrile group of a compound also containing an ester group.

In its broad aspect the method of the invention comprises reducing a chemical compound having a reducible functional group by slowly associating in an inert liquid carrier one component of a reagent consisting of an alkali metal borohydride and a boron halide with the other component of the reagent in the presence of an amount of the compound to be reduced corresponding stochiometrically at least to the amount of said one component of the reagent. Thus, a mixture of a boron halide and the compound to be reduced in stoichiometric proportions may be added slowly to a solution of the alkali metal borohydride. Preferably, however, the boron halide is added slowly to a solution of the alkali metal borohydride containing the compound to be reduced and in which the borohydride and the compound to be reduced are present in stoichiometrical proportions. The reaction generally proceeds to completion at room temperature. A higher temperature may be used but the temperature should be sufficiently low that the borohydride does not substantially thermally decompose.

The preferred reagent of the present invention consists of sodium borohydride and either boron trifluoride (four moles per three moles of sodium borohydride) or boron trichloride (one mole per three moles of sodium borohydride) in the dimethylethers of diethylene glycol and triethylene glycol. The boron halide can be added as a gas or in the form of its addition compounds with the solvents mentioned above or its addition compounds with other ethers, such as diethyl ether, anisole, tetrahydrofuran, tetrahydropyran, etc. Boron bromide can be used but offers no advantage and has the serious disadvantage of rapidly splitting ethers. Boron triiodide can be used but is difficult to hande and tends to react with the solvents.

Potassium borohydride can be used but has a lower solubility in organic solvents than sodium borohydride. Lithium borohydride is readily soluble in a large variety of solvents, such as diethyl ether, tetrahydrofuran, dimethylether of ethylene glycol and dimethylether of diethylene glycol, but its cost at present is much greater than sodium borohydride. Consequently, the preferred reagent is sodium borohydride activated by boron trifluoride or boron trichloride.

While in the practice of the present invention it is preferred to employ a solvent for the alkali metal borohydride as the inert liquid carrier, other inert liquid carriers may be used. Usually, however, when the liquid carrier is not a solvent for the alkali metal borohydride, more satisfactory results are obtained if a solvent, preferably in an amount sufficient to solubilize the alkali metal borohydride, is used in conjunction with the non-solvent liquid carrier.

When it is desired to reduce selectively the nitrile group of a compound which also contains an ester or a nitro group, it is preferable to employ amounts of the components of the reagent of the invention not substantially greater than the amounts theoretically required to reduce the nitrile group.

The terms "hydrogenation" and "reduction" are used interchangeably herein. The term "alkali metal borohydride" as used herein is intended to mean the simple alkali metal borohydrides, such as sodium borohydride, potassium borohydride and lithium borohydride.

The reducing behavior of the reagent of the invention is illustrated by the following tests wherein 7.15 millimoles of sodium borohydride (28.6 moles of hydride) were mixed with the quantity of the compound to be reduced indicated in the following table in dimethylether of diethylene glycol. To this mixture there was added 4.0 millimoles of boron trifluoride diethyl etherate over a period of 2 to 3 hours. The reaction mixture was allowed to stand at room temperature for periods of time from one half to two hours and then was analyzed for residual hydride content. Typical results are shown in the following table.

TABLE I

| Compound | Amount of Compound in Millimoles | Reaction Time in Hours | Hydride in Millimoles for Complete Reduction | Hydride Consumed in Millimoles |
|---|---|---|---|---|
| Benzophenone | 5.24 | 0.5 | 5.24 | 6.3 |
|  | 5.74 | 1.0 | 5.74 | 6.7 |
| Styrene oxide | 4.86 | 0.5 | 4.86 | 4.8 |
| Ethyl benzoate | 4.80 | 0.5 | 9.60 | 1.1 |
|  | 5.57 | 2.0 | 11.14 | 2.1 |
| Ethyl acetate | 5.23 | 2.0 | 10.46 | 8.7 |
| γ-Butyrolactone | 3.97 | 0.5 | 7.94 | 7.3 |
| Benzonitrile | 4.86 | 0.5 | 9.72 | 9.7 |
| Butyronitrile | 5.41 | 0.5 | 10.82 | 10.2 |
| N,N-Dimethyl-benzamide | 5.50 | 1.0 | 11.0 | 12.1 |
| Azobenzene | 5.08 | 0.5 | 10.2 | 11.4 |
| Nitrobenzene | 5.02 | 0.5 | 15.1 | 0.2 |
| Nitropropane | 4.83 | 0.5 | 14.5 | 0.2 |

Similar results were obtained with boron trichloride in dimethylether of diethylene glycol. Similar results also were obtained with lithium borohydride in diethyl ether and in tetrahydrofuran.

The remarkable difference in the action of the reagent of the present invention as compared with alkali metal borohydrides is illustrated in the following table in which M represents an alkali metal and X represents a halogen.

TABLE II

| Compound | Reagent | |
|---|---|---|
|  | $MBH_4$ | $MBH_4 + BX_3$ |
| Benzophenone | Reduction | Reduction. |
| Ethyl benzoate | Slow reduction | Very slow reduction. |
| Ethyl acetate | do | Moderately slow reduction. |
| Butyrolactone | do | Rapid reduction. |
| Benzonitrile | Very slow reduction | Do. |
| n-Butyronitrile | do | Do. |
| Azobenzene | Slow reduction | Do. |

The invention is illustrated further by the following specific examples.

Reduction of benzonitrile

In a one liter round-bottomed flask was placed 0.40 moles of benzonitrile, 0.22 mole of sodium borohydride and 400 ml. of dimethylether of diethylene glycol. The apparatus was flushed with nitrogen and 0.26 moles of freshly distilled boron trifluoride diethyl etherate was added slowly through a dropping funnel over a period of two hours. The reaction mixture was allowed to stand an additional hour at room temperature and then was heated at 60° to 70° C. for 15 minutes. Water and then sodium hydroxide were added. The product was taken up in diethyl ether, dried and distilled. There was obtained a 67 percent yield of benzylamine, B.P. 184° C.

The same procedure was applied to p-chlorobenzonitrile, p-nitrobenzonitrile and capronitrile. In all cases yields of amine of 65 to 85 percent were realized.

Reduction of styrene oxide

In a one liter round-bottomed flask was placed 0.40 moles of styrene oxide, 0.11 moles of sodium borohydride and 300 ml. of dimethylether of diethylene glycol. The apparatus was flushed with nitrogen and 0.13 moles of boron trifluoride dissolved in 100 ml. of the solvent was added slowly over a period of two hours. The reaction mixture was permitted to stand for another hour and then was heated for 15 minutes at 60° to 70° C. After hydrolysis, the product was taken up in diethyl ether, dried and distilled. There was recovered a 72 percent yield of mixed alcohols containing approximately 80 percent of 2-phenylethanol and 20 percent of 1-phenylethanol.

Reduction of ethyl stearate

In one liter round-bottomed flask was placed 0.40 moles of ethyl stearate, 0.22 moles of sodium borohydride and 400 ml. of dimethylether of diethylene glycol. The apparatus was flushed out with nitrogen and 0.065 moles of boron trichloride in diethyl ether was added slowly through a dropping funnel over a period of four hours. Water was added to the reaction mixture to decompose residual hydride and the solid product was separated and recrystallized from aqueous alcohol. There was obtained an 80 percent yield of stearyl alcohol.

Reduction of adiponitrile

In a one liter round-bottomed flask was placed 0.20 moles of adiponitrile, 0.22 moles of lithium borohydride and 400 ml. of diethyl ether. The apparatus was flushed out with nitrogen and 0.065 moles of boron trichloride in diethyl ether was added slowly through a dropping funnel over a period of two hours. The reaction mixture was heated under reflux for an additional hour. Water then was added to hydrolyze residual hydride and the product, hexamethylene diamine, was isolated. An 84 percent yield of distilled product was realized.

I claim:

1. In the reduction of an organic compound having a nitrile group wherein the reduction is effected in an inert liquid carrier by an alkali metal borohydride selected from the group consisting of sodium borohydride, potassium borohydride and lithium borohydride, said organic compound being free of olefinic bonds and acetylenic bonds, the method of modifying the reducing properties of the alkali metal borohydride which comprises introducing a boron halide into the inert liquid carrier containing the alkali metal borohydride while simultaneously maintaining in the liquid carrier an amount of said organic compound at least corresponding stoichiometrically to at least one of the other two reactants.

2. In the reduction of an organic compound having a nitrile group wherein the reduction is effected in an inert liquid carrier by an alkali metal borohydride selected from the group consisting of sodium borohydride, potassium borohydride and lithium borohydride, said organic compound being free of olefinic bonds and acetylenic bonds, the method of modifying the reducing properties of the alkali metal borohydride which comprises adding a mixture of a boron halide and said compound in stoichiometric proportions to the alkali metal borohydride in the inert liquid carrier.

3. In the reduction of an organic compound having a nitrile group wherein the reduction is effected in an inert liquid carrier by an alkali metal borohydride selected from the group consisting of sodium borohydride, potassium borohydride and lithium borohydride, said organic compound being free of olefinic bonds and acetylenic bonds, the method of modifying the reducing properties of the alkali metal borohydride which comprises adding a boron halide to a mixture of said compound and the alkali metal borohydride in stoichiometric proportions in the inert liquid carrier.

4. The method as claimed by claim 3 wherein the liquid carrier includes a solvent for the alkali metal borohydride in an amount at least sufficient to solubilize the alkali metal borohydride.

5. The method as claimed by claim 4 wherein the boron halide is selected from the group consisting of boron trifluoride and boron trichloride.

6. The method as claimed by claim 4 wherein the boron halide is added in the form of its addition compound with an ether.

7. The method as claimed by claim 5 wherein the boron halide is added in the form of its addition compound with an ether.

8. The method as claimed by claim 5 wherein the alkali metal borohydride is sodium borohydride.

9. The method as claimed by claim 7 wherein the alkali metal borohydride is sodium borohydride.

10. The method as claimed by claim 8 wherein the solvent is selected from the group consisting of dimethylethers of diethylene glycol and triethylene glycol.

11. The method as claimed by claim 9 wherein the solvent is selected from the group consisting of dimethylethers of diethylene glycol and triethylene glycol.

References Cited in the file of this patent

UNITED STATES PATENTS 2,576,311    Schlesinger et al.    Nov. 27, 1951
2,683,721    Schlesinger    July 13, 1954
2,765,346    Paul et al.    Oct. 2, 1956

OTHER REFERENCES

Paul et al.: Bulletin Societe Chimique de France (1952), p. 550.

Fuchs et al.: Nature, 173, 125–6 (1954).

Fuchs et al.: Nature, 175, 346 (1955).

Hackh's Chemical Dictionary, 3rd edition; page 139; Blakiston Company, Philadelphia.